United States Patent [19]
Pierret et al.

[11] Patent Number: 5,296,798
[45] Date of Patent: Mar. 22, 1994

[54] METHOD OF REGULATING AN EXCITATION CURRENT OF AN INDUCTOR OF A MOTOR VEHICLE ALTERNATOR

[75] Inventors: Jean-Marie Pierret, Paris; Christian Ducrot, Lyons, both of France

[73] Assignee: Valeo Equipments Electriques Moteur, Saint-Ouen Cedex, France

[21] Appl. No.: 774,081

[22] Filed: Oct. 9, 1991

[30] Foreign Application Priority Data

Oct. 15, 1990 [FR] France ................... 90 12684

[51] Int. Cl.⁵ .................................... H02J 7/24
[52] U.S. Cl. ............................. 322/28; 320/64
[58] Field of Search ............. 322/25, 27, 28, 72, 322/73, 90, 99; 320/64, 68; 323/282, 284

[56] References Cited

U.S. PATENT DOCUMENTS

| | | | |
|---|---|---|---|
| 4,555,657 | 11/1985 | Kato et al. | 320/64 |
| 4,670,704 | 6/1987 | Maehara et al. | 322/28 X |
| 4,789,817 | 12/1988 | Asakura et al. | 322/28 |
| 4,920,308 | 4/1990 | Edwards et al. | 322/28 X |
| 5,105,143 | 4/1992 | Marumoto et al. | 322/28 |

FOREIGN PATENT DOCUMENTS

0378075 1/1990 European Pat. Off. .
2933642 8/1979 Fed. Rep. of Germany .
4006387 3/1990 Fed. Rep. of Germany .

Primary Examiner—Kristine L. Peckman
Attorney, Agent, or Firm—Morgan & Finnegan

[57] ABSTRACT

In a method for regulating the excitation current of an inductor of a motor vehicle alternator, the alternator is of the kind comprising a rectifier bridge supplying a rectified voltage (which is to be regulated) having a low frequency fluctuation of variable amplitude with a high frequency waveform of constant amplitude superimposed on it, the rectified voltage Ub+ being thus a periodic voltage, each cycle of which comprises a first alternate period, during the course of which a voltage is applied to the inductor of the alternator, and a second alternate period, during which no voltage is applied to the inductor. The method comprises the steps of initiating measurement of the rectified voltage during an intermediate part of one of the two alternate periods; evaluating the measurement, over a predetermined time sampling break, by sampling, that is to say by carrying out successive iterative measurements; comparing the measured value of the rectified voltage with a calculated theoretical value thereof; and deducing from that comparison the durations of the alternate periods for the next following cycle.

5 Claims, 2 Drawing Sheets

METHOD OF REGULATING AN EXCITATION CURRENT OF AN INDUCTOR OF A MOTOR VEHICLE ALTERNATOR

FIELD OF THE INVENTION

The present invention relates to methods of regulating an alternator by digital processing of the regulating function. The invention is particularly applicable in connection with alternators for motor vehicles.

BACKGROUND OF THE INVENTION

An alternator is an electrical generating machine that produces alternating voltages and currents, the frequency of which is proportional to the speed at which the inductor or rotor of the alternator is driven. The rotor induces an alternating current in the stator windings of the machine. At the output of the stator windings, diodes are provided to rectify the alternating current so that a unidirectional (ideally a d.c.) voltage is available in the vehicle.

An alternator requires voltage regulation such as to produce an electromotive force which will be substantially constant, regardless of the number of circuits demanding an output from the machine at any given moment, and regardless of the speed of the engine of the vehicle in order to ensure correct charging of the battery of the vehicle.

The principle of regulation which is currently in general use is illustrated in FIG. 1 of the accompanying drawings, to which reference is invited. At the output of the diodes which constitute the rectifier bridge (not shown) there is connected a regulator in which the rectified alternator voltage Ub+ is used so as to enable the excitation current Ii in the inductor winding I to be regulated by means of a power control stage Tr of the regulator. This power stage Tr is indicated in FIG. 1 in the form of a transistor, the emitter of which is connected to earth, with its collector being connected to one end of the inductor winding 1. The other end of the inductor winding is connected to the alternator output which is itself connected to the battery.

The voltage Ub+, after rectification, still displays a waveform of substantially varying amplitude, which is generated in particular by virtue of the switching of the diodes in the rectifier bridge and by parasitic effects emitted by the various devices constituting the load.

In order to overcome this drawback, the regulator also includes a filter F and a comparator C. The voltage Ub+ is filtered through the filter F, the output of which is connected to a first input of the comparator C, which receives a voltage reference Vref on its second input. The output of the comparator C is connected to the base of the transistor Tr. If the voltage Ub+ is smaller than the reference voltage Vref, a current Ii is applied on the inductor by the battery via the filter F and the comparator C. On the other hand, if Ub+ is greater than Vref, the transistor Tr becomes non-conducting, and no current is supplied to the inductor I, that is to say the excitation current is modulated either completely or not at all.

A recirculation diode D which is connected in series, back to back with the power stage Tr, ensures that when the latter is non-conducting, the excitation current Ii is maintained in the inductor winding I between two transitional states of the power stage Tr. Thus, voltage applied to the load network is regulated after filtering by controlling the excitation of the generating unit comprising the alternator itself and its rectifier bridge. The generator output voltage Ub+ thus has a regulating waveform which mirrors that of the excitation current, with its amplitude varying as a function of the excitation of the alternator. Thus, this voltage is a cyclic voltage having a period T, each cycle of which comprises an alternate period T1, in the course of which the voltage is applied to the inductor, and an alternate period T2, in the course of which no voltage is applied to the inductor. The ratio T1/T2 is called the cyclic ratio, and it is desirable that this cyclic ratio should vary as slowly as possible.

The illustration of the regulating principle that has just been given is of course very sketchy, and in fact, a regulating circuit may use a large number of transistors. This has led to the regulating circuits being made in the form of integrated circuits. Such an integrated regulating circuit may also be a multi-functional circuit, that is to say it not only performs the regulation function itself, but also at least the function of indicating the state of battery charge and possibly also the tension in the belt by which the alternator is coupled to the engine of the vehicle. However, circuits of this kind remain somewhat restricted as to their structure and their mode of operation, and their design and manufacture are both lengthy and costly.

In addition, in conventional regulators, the response of the comparator is of the "all or nothing" kind, that is to say it indicates whether the excitation current should or should not be supplied, but it offers no quantitative values concerned with large variations in the cyclic ratio. These variations are even larger according to whether the comparator C acts with a greater or smaller time delay due to the filter F.

The need to accommodate a number of different parameters dictated by the operation of the alternator, together with the requirements of manufacturers to provide larger and larger amounts of power, lead to a need for careful control of the actual operation of the generator, good adaptation to the system comprising the control circuits of the vehicle, and high operational stability.

In order to overcome these problems, it has already been attempted to use digital techniques by means of a microprocessor. Even though such techniques enable the computation of a theoretical value of the excitation voltage to be carried out as a function of external parameters, such as state of charge of the battery, battery temperature, running state of the engine, belt tension, and so on, their use has still not enabled complete regulation to be achieved. This is because of the difficulty of attenuating varying amplitudes found in the excitation voltage, so that it can be measured sufficiently accurately and reliably.

DISCUSSION OF THE INVENTION

An object of the present invention is to overcome the above problems. To this end, it proposes a method of regulating the excitation current of an inductor of a motor vehicle alternator, the alternator comprising, in particular, a rectifier bridge delivering a rectified voltage Ub+ to be regulated, with the rectified voltage having a low frequency waveform of variable amplitude on which a high frequency waveform of constant amplitude is superimposed, the rectified voltage Ub+ being thus a cyclic voltage having a period T, each cycle of which comprises a first alternate period having a duration T1, in the course of which a voltage is applied to the inductor of the alternator, and a second alternate period having a duration T2, in the course of which no voltage is applied to the inductor, characterized in that the said method comprises the steps of:

initiating measurement of the rectified voltage Ub+ during an intermediate part of one of the alternate periods T1, T2 of a cycle, evaluating the measurement, over a sampling break having a predetermined duration Te, by sampling, that is to say by carrying out successive iterative measurements, comparing the measured value of the voltage Ub+ with a calculated theoretical value thereof, and deducing from that comparison the values of the periods T1 and T2 for the next following cycle of period T.

In this way, by centering the measurement of the rectified voltage that is to be regulated on the longer of the two alternate periods, the variations which are due mainly to fluctuation are attenuated during regulation. Similarly, alternator fluctuation is attenuated by effecting the measurement by using a sampling technique.

It is a feature of the invention that the method thus provides a digital filter for the regulation of the alternator.

It will be appreciated that the method in accordance with the invention performs quantitative measurement, that is to say it enables the desired value of the excitation current to be applied to the inductor, with the value of this current being dependent on the cyclic ratio defined above.

A practical embodiment of the invention will be described below by way of example only, and compared with the prior art, with reference to the accompanying drawings, and further features and advantages of the invention will appear more clearly from study thereof.

DESCRIPTION OF A PREFERRED EMBODIMENT OF THE INVENTION

Figure 2:
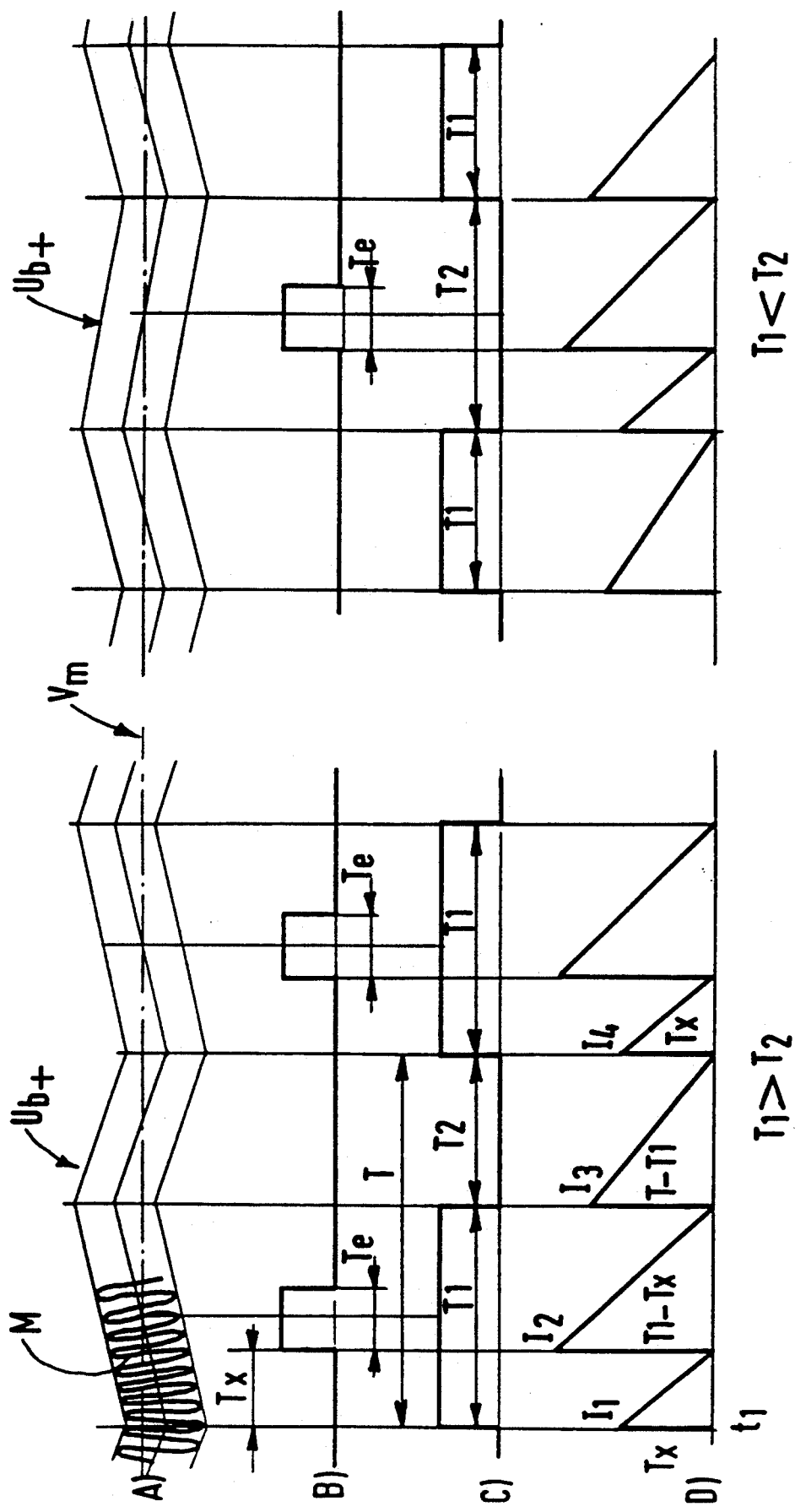
FIG. 2 consists of a set of time diagrams, illustrating the operation of the method in accordance with the present invention.

FIG. 2 consists of four different diagrams labelled A, B, C and D respectively. These will be referred to in this description as FIGS. 2A, 2B, 2C and 2D.

FIG. 2A shows the voltage Ub+ to be regulated at the alternator output and on the electrical network of the vehicle, with time being represented on the abscissa, and voltage on the ordinate. The voltage Ub+ has a low frequency regulated waveform, on which is superimposed a so-called alternator wave M, having a very much higher frequency and being inherent in particular in the switching of the diode. This wave M is of constant amplitude, while the variations in the low frequency wave are due to variations in the excitation current applied to the inductor. The mean value of the voltage Ub+ thus oscillates about a mean voltage Vm.

Figure 1:
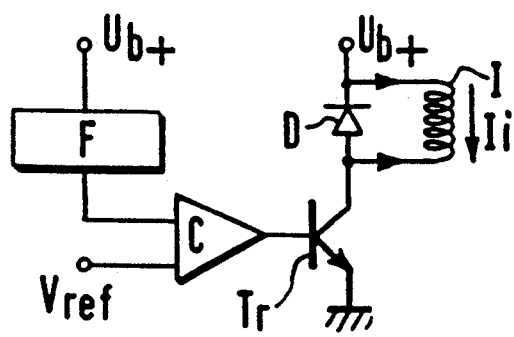
FIG. 1 is a block diagram showing the known principle, already described above, of regulating an alternator.

FIG. 2C is the time diagram for the cyclic excitation signal, which has a period T consisting of two alternate periods T1 and T2. As has already been explained above, the ratio T1/T2 is referred to as the cyclic ratio. In the course of the period T1, the voltage Ub+ increases, which corresponds to an application of the voltage on the inductor I (with transistor Tr in FIG. 1 being in a conducting state), while during the period T2, the voltage Ub+ decreases, which corresponds to voltage not being applied to the inductor I. It is in this latter state that the transistor Tr is non-conducting in FIG. 1.

The cyclic ratio may in theory vary from 0 to 100%, and its value depends in particular on the requirements of the load circuits concerned and on the state of charge of the battery.

In FIG. 2A, the mean value of the voltage Ub+ is equal to the voltage Vm halfway through each of the periods T1 and T2. The measurement of the voltage Ub+ is not disturbed by the slow regulation wave if, as shown in FIG. 2B, this measurement is carried out during a sampling break, of duration Te, the mid-point of which coincides with the mid-point of either the period T1 or the period T2. The time Te must of course always be shorter than the duration of the period T1 or T2 on which the sampling break is centered, in such a way as to avoid the measurement of any incorrect values.

The period T1 or T2 in which the sampling break is to occur is selected to be that one which has the longer duration, after the respective values of T1 and T2 have been calculated. In this connection, FIG. 2 shows two cases. The left hand side of FIG. 2 corresponds to the case in which T1 is greater than T2, with the sampling break therefore centered on the period T1, while the right hand side of FIG. 2 corresponds to the opposite case in which T1 is smaller than T2, so that the sampling break Te is therefore centered on the period T2. Thus, the sampling break Te begins after a defined time Tx measured from the beginning of the longer of the two periods T1 and T2. If T1 is greater than T2 (i.e. as shown on the left hand side of FIG. 2), the value of the time Tx is (T1−Te)/2, while if on the other hand T1 is greater than T2 as indicated on the right hand side of FIG. 2, the value of the time Tx is (T2−Te)/2.

Figure 3:
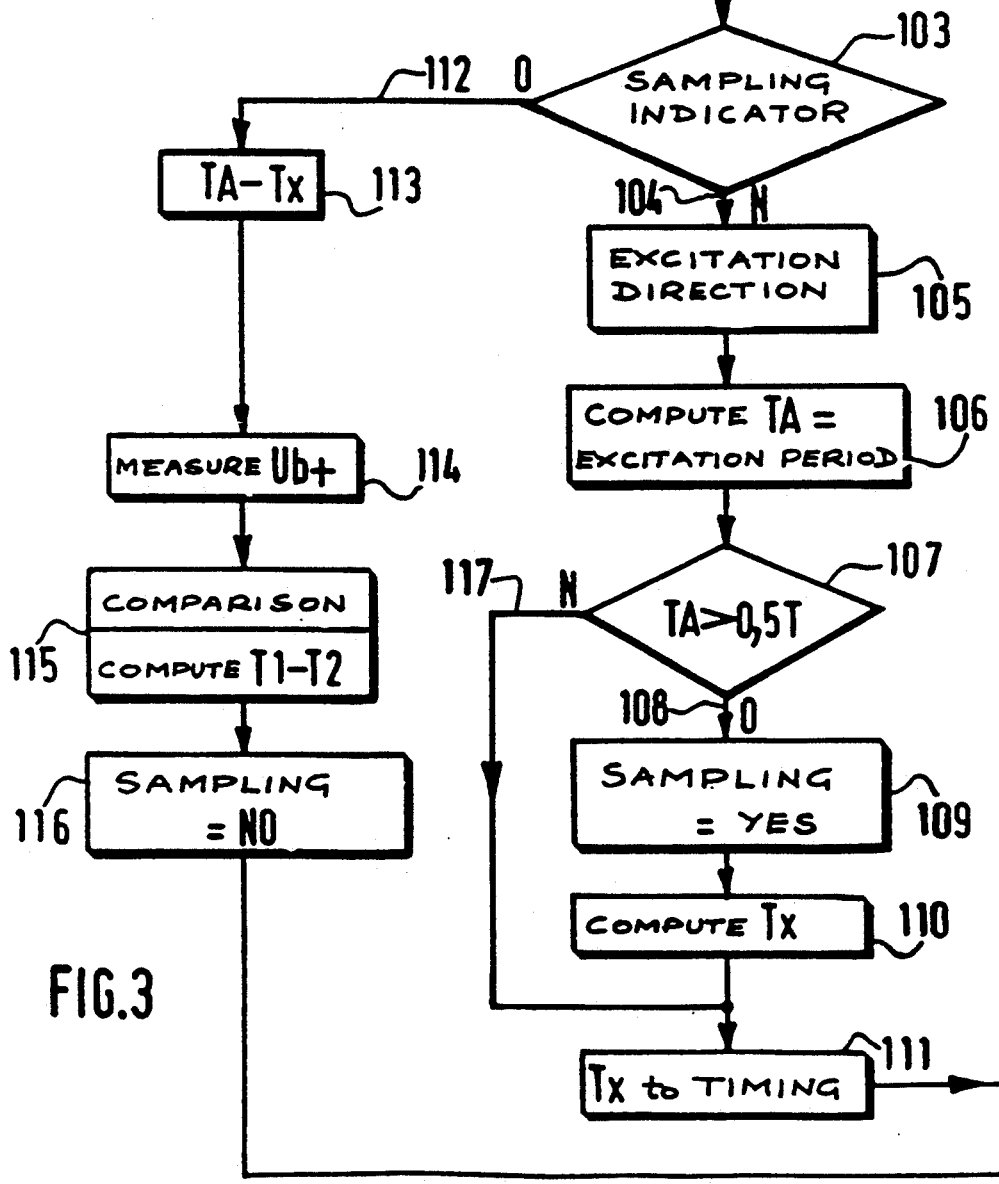
FIG. 3 is an example of a functional flow chart illustrating how the invention operates in practice.

All of these operations are carried out using a program performed by a microprocessor. By way of an example, such a program consists of the steps shown in FIG. 3. In FIG. 3, the principal program 100 permanently computes the theoretical reference value of the voltage Ub+ to be regulated. To this end, the microprocessor is able to receive data as diverse as the state of charge of the battery, the temperature of the battery, the running mode of the engine, and so on. It then makes the necessary computations taking all these data into account. The principal program 100 does not form a part of the present invention and will not be described in any further detail here.

A timing operation 101 receives the values computed by the principal program 100 and enables the latter to be interrupted, as indicated at 102, thus enabling the microprocessor to carry out the regulation program itself.

The regulation program itself will now be described in detail, starting at the instant t1 just before the commencement of the period T1, that is to say at the instant when the timing operation 101 has caused the interruption I1, indicated in FIG. 2D, to occur.

The sampling indicator has previously been positioned at N ("NO"), and its output 104 is selected. The following operations are then carried out:

At 105, the output level of the excitation control is inverted in such a way as to commence the period T1.

At 106, the value TA of the period T1, previously computed, is read.

At 107, the value TA is verified as being greater than T/2, T having a fixed predetermined value.

In the example under consideration, since the response is positive, the output 108 from the test at 107 causes the sampling indicator 103 to be switched, as indicated at 109, to the position Y ("YES"), since T1, being greater than T/2, must be the longer of the two periods T1 and T2.

The time Tx=(TA−Te)/2 is then calculated as indicated at 110. This is the time period which must separate the beginning of the period T1 from the commencement of the sampling break, Te being of course a fixed predetermined value.

At 111, the value Tx thus computed is fed into the timing operation at 101. At the end of the time Tx, the timing operation 101 initiates, at 102, an interruption which is shown in FIG. 2D at I2.

The sampling indicator 103 having been set at the Y position by 109, it is its output 112 that is selected, so that the following operations are now carried out:

The value T1−Tx, which corresponds to the duration of the last part of the period T1, is fed at 103 into the timing operation.

At 114, the voltage Ub+ is measured during the period Te of the sampling break, and its mean value is computed.

At 115, the value of the voltage Ub+ measured at 114 is compared with the theoretical value computed by the principal program 100, and new values for the periods T1 and T2 are deduced for the next full period T.

At 116, the sampling indicator 103 is switched to the position N ("NO").

At the end of the period T1−Tx, the timing operation 101 initiates a further interruption, which is indicated at 13 in FIG. 2D. Since the sampling indicator has been placed in the N position in the step 116, it is its output 104 that is now selected, whereupon the following further operations take place:

At 105, the output level of the excitation control is inverted so as to initiate the period T2.

At 106, the value TA of the period T2 is read by carrying out the operation T2+TA=T−T1.

At 107, a test is carried out to establish whether the value TA is greater than T/2.

In the example considered above, since the response is negative (i.e. T1 is greater than T2), it is the output 117 of the test circuit 107 that is now operative. This output 117 leads directly to the step 111 in which the timing operation 101 is fed with the value TA corresponding to the period T2.

At the end of the period TA=T2=T−T1, the timing operation 101 initiates a new interruption which is indicated in FIG. 2D at I4. The effects of the interruption 14 are identical to those of the interruption I1 described above. A new cycle is now commenced.

The description of the regulating program which has just been given, takes as its basis, by way of example only the left hand side of FIG. 2, that is to say the case in which the period T1 is longer than the period T2. It is to be understood that the same regulating program is fully applicable to the right hand side of FIG. 2, i.e. the case where the period T1 is shorter than the period T2.

What is claimed is:

1. A method of regulating an excitation current of an inductor of a motor vehicle alternator, said alternator comprising a rectifier bridge delivering a rectified voltage to be regulated, said rectified voltage having a low frequency waveform of variable amplitude on which a high frequency waveform of constant amplitude is superimposed, said rectified voltage being thus a cyclic voltage, each cycle of which comprises a first alternate period having a duration T1, in the course of which a voltage is applied to the inductor of the alternator, and a second alternate period having a duration T2, in the course of which no voltage is applied to the inductor, wherein said method comprises the steps of:
   initiating measurement of the rectified voltage during one of said alternate periods of each said cycle,
   evaluating the measurement, over a sampling break having a predetermined duration Te by carrying out successive iterative measurements of the rectified voltage and computing a mean value of said rectified voltage,
   comparing the mean value of said rectified voltage with a calculated theoretical value thereof,
   deducing from that comparison the durations of the periods T1 and T2 for the next following cycle,
   applying a voltage to the inductor of the alternator for said deduced duration of T1, and
   removing said applied voltage from the inductor of the alternator for said deduced duration of T2.

2. A method according to claim 1, comprising the steps of:
   determining during each said cycle, which of the two alternate periods T1 or T2 is the longer, and
   computing for the longer of the two alternate periods, an initial time immediately preceding the sampling break, said initial time being computed such that the mid-point of the sampling break coincides with the mid-point of the longer of the two alternate periods.

3. A method according to claim 2, wherein the initial time is equal to (T1−Te)/2 if the alternate period T1 is longer than the alternate period T2, with the initial time being equal to (T2−Te)/2 if the alternate period T1 is shorter than the alternate period T2.

4. A method according to any one of the preceding claims, wherein the sampling measurement of the rectified voltage is carried out by means of a digital filter.

5. A method of regulating a motor vehicle alternator having circuitry for delivering a rectified voltage to be regulated to an inductor, said rectified voltage having cycles, each cycle having a first alternate period having a duration $T_1$ during which a voltage is applied to the inductor and a second alternate period having a duration $T_2$ during which no voltage is applied to the inductor, the method comprising the steps of:
   making successive iterative measurements of said rectified voltage during a period $T_e$, said period $T_e$ occurring during one of said alternate periods of one of said cycles,
   computing a mean value of said rectified voltage measurements,
   comparing said mean value with a calculated theoretical value,
   deducing from that comparison the durations of periods $T_1$ and $T_2$ for the next following cycle,
   applying a voltage to the inductor for said deduced duration of period $T_1$, and
   removing said applied voltage from the inductor for said deduced duration of period $T_2$.

* * * * *